US006901507B2

(12) United States Patent
Wishneusky

(10) Patent No.: US 6,901,507 B2
(45) Date of Patent: May 31, 2005

(54) CONTEXT SCHEDULING

(75) Inventor: John A. Wishneusky, Fitzwilliam, NH (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 09/989,482

(22) Filed: Nov. 19, 2001

(65) Prior Publication Data

US 2003/0097547 A1 May 22, 2003

(51) Int. Cl.$^7$ .................................................. G06F 9/48
(52) U.S. Cl. ...................... 712/228; 712/215; 712/216
(58) Field of Search ................................ 712/214, 215, 712/216, 228; 718/107, 108

(56) References Cited

U.S. PATENT DOCUMENTS

| | | | |
|---|---|---|---|
| 4,975,828 A | 12/1990 | Wishneusky et al. | ....... 364/200 |
| 6,092,180 A | 7/2000 | Anderson et al. | |
| 6,728,959 B1 * | 4/2004 | Merkey | ...................... 718/102 |

FOREIGN PATENT DOCUMENTS

EP          0 942 366        9/1999

OTHER PUBLICATIONS

Fiske et al., "Thread Prioritization: A Thread Scheduling Mechanism for Multiple–Context Parallel Processors", Proceedings of the First Symposium on High Performance Computer Architecture, IEEE, Jan. 22, 1995–Jan. 25, 1995, pp. 210–221.*

Agarwal, et al., "Sparcle; An Evolutionary Processor Design for Large–Scale Multiprocessor", *IEEE Micro*, 13(3):48–61 (1993).

* cited by examiner

*Primary Examiner*—William M. Treat
(74) *Attorney, Agent, or Firm*—Fish & Richardson P.C.

(57) ABSTRACT

A programmable processing system that executes multiple instruction contexts includes an instruction memory for storing instructions that are executed by the system, fetch logic for determining an address of an instruction, with the fetch logic including scheduling logic that schedules execution of the instruction contexts based on condition signals indicating an availability of a hardware resource, with the condition signals being divided into groups of condition signals, which are sampled in turn by the scheduling logic to provide a plurality of scan sets of sampled conditions.

23 Claims, 3 Drawing Sheets

CONTEXT SCHEDULING

BACKGROUND

This invention relates to scheduling contexts in a computer processor.

Instruction execution in a computer processor may be accomplished by partitioning a stream of instructions into individual contexts. Contexts are "swapped" in or out of execution according to a scheduling system associated with the computer processor. How and when contexts are swapped affects availability of computer processor resources and overall processor performance.

DESCRIPTION

Figure 1:
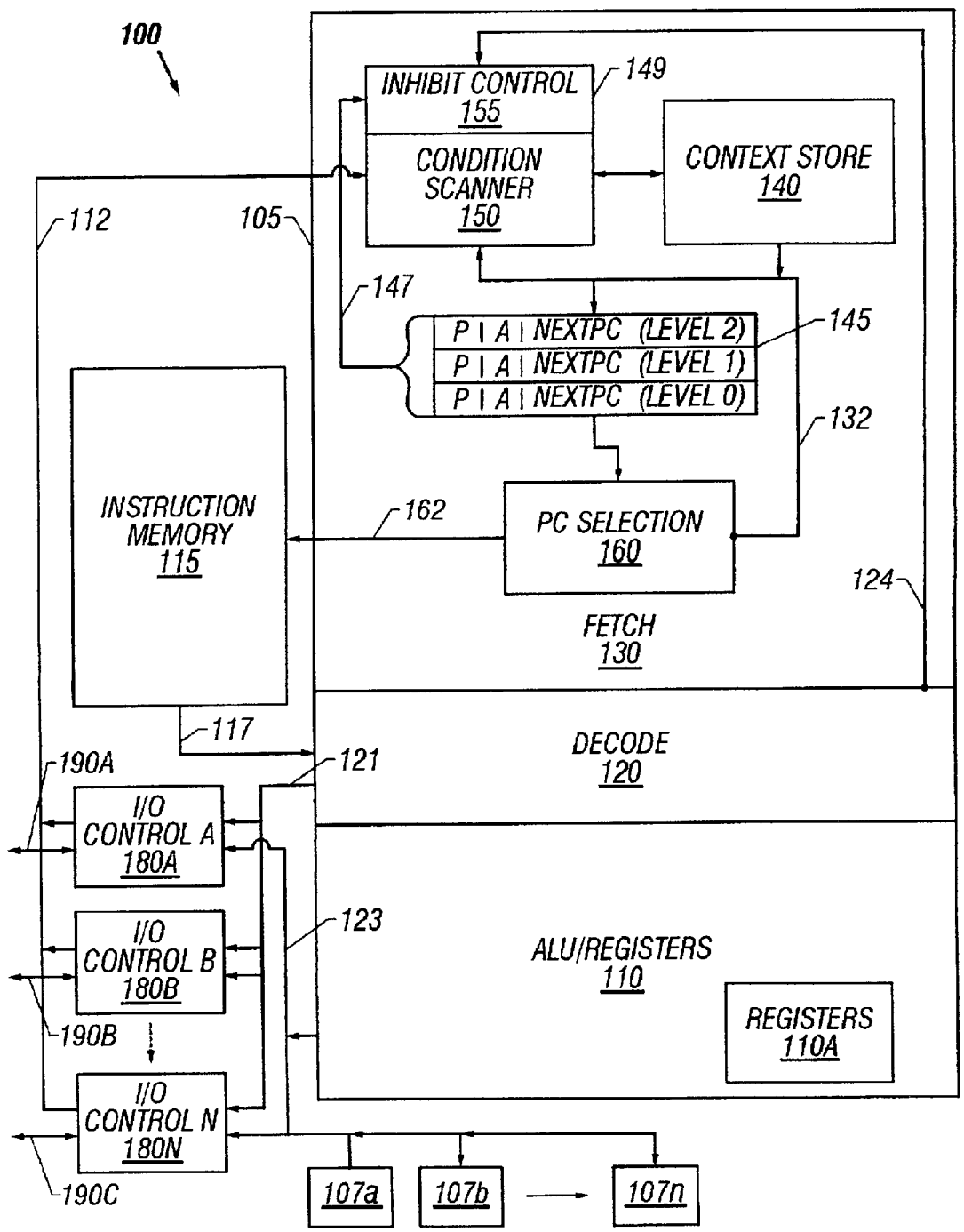
FIG. 1 shows a block diagram of a processing system that includes context scheduling logic.

Referring to FIG. 1, a programmable processing system 100 includes a computer processing unit (CPU) 105, an instruction memory 115 for holding instructions for CPU 105 and a common data bus 123 for transferring data from CPU 105 to input/output bus controllers (I/O controllers) 180A–180N. I/O controllers 180A–180N are connected to both data bus 123 and input/output buses (I/O buses) 190A–190N, respectively, and manage data transfers between the respective buses 123 and 190A–190N. Additional logic blocks 107A–107N, e.g., CPUs, may also be connected to data bus 123 that transfer data to and from I/O controllers 180A–180N. Programmable system 100 is designed to provide high-speed data transfers and communications over I/O buses 190A–190N, e.g., performing data transfers and communications according to Ethernet or High-Speed Serial protocols or the like.

I/O controllers 180A–180N are logic blocks designed to manage the I/O operations associated with a specific I/O bus 190A–190N, respectively. Each I/O controller generally will include at least one memory buffer (a "queue") that is filled and emptied as data is sent and received over I/O buses 190A–190N and also maintains hardware status bits to indicate the status of a queue or the availability of an I/O controller 180A–180N for processing data transfers. I/O controllers 180A–180N output the hardware status bits to CPU 105 on condition signal lines 112. Some examples of hardware status bits indications include: the availability of a buffer, the storing of an address in a queue, the availability of an I/O controller for I/O operations or the state of a mutex being set or cleared.

CPU 105 includes decode logic 120 for decoding instructions from instruction memory 115 and fetch logic 130 that outputs the address of an instruction to instruction memory 115. Fetch logic 130 also includes PC selection logic 160 for selecting the instruction address (the "program counter" (PC)) that is output on address bus 162 to instruction memory 115. Each PC address output on bus 162 causes instruction memory 115 to output an instruction on instruction bus 117 to decode logic 120. CPU 105 also includes ALU/Register logic 110 that performs arithmetic operations and data reads and writes according to decode signals from decode logic 120.

System 100 includes several different hardware resources that operate at different speeds, therefore, an instruction may be processed faster by one hardware resource than another hardware resource is able to respond. As an example, an instruction may cause CPU 105 to request a data transfer to or from one of the I/O buses 190A–190N. The data read may require the use of a memory buffer associated with the corresponding I/O controller, and, therefore, if that buffer is unavailable, CPU 105 would need to be stalled to wait for the availability of the buffer. To more effectively utilize the processing speed of CPU 105 while waiting for hardware resources to become available, programmable processing system 100 is configured to execute multiple instruction streams ("contexts"), where a first context may begin execution and then be pre-empted by a second context before completion of the first context.

To manage the scheduling of a multiple contexts, fetch logic 130 includes context scheduler logic 149 that uses condition signals 112, in part, to determine when to schedule a new context. Fetch logic 130 also includes a context store 140 that contains "starting event" information and PC values for, e.g., sixteen (16) contexts that may be scheduled by context scheduler 149. Starting event information is used to determine what hardware resource, as indicated by a specified condition signal 112, that must be available before scheduling a context for pre-emption. Fetch logic 130 also includes an executing contexts stack (ECS) 145 for storing context information that is used by context scheduler 149 to store "pre-empting" context information for three (3) contexts at three different priority levels.

Context information is stored in ECS 145 according to the three priority levels (from Level 0 to Level 2, where Level 2 is the highest priority level). Therefore, ECS 145 provides a mechanism for storing a higher priority context for execution before a lower priority context when both the higher and lower priority contexts are waiting for the availability of the same hardware resource, as will be explained.

ECS 145 contains the context information for each context that may be executed at each priority level, i.e., the starting PC value for each context. ECS 145 also includes execution status bits "P" and "A", which indicate when a context at a particular priority level is ready to pre-empt the execution of any lower priority contexts (the P-bit is set), and whether a particular context stored in ECS 145 is currently being executed (the A–bit is set). In operation, a "background" context, at priority level zero (0) will be executed when no higher priority level context has been placed in ECS 145 with the P-bit set. However, whenever a higher priority context is placed in ECS 145 with the P-bit set, the PC selection logic 160 will pre-empt the currently executing context and begin execution of the highest priority context in ECS 145. ECS 145 contains only one entry for each priority level (Level 0–Level 2) so that only one context for each priority may be scheduled at a time.

The sixteen contexts that may be scheduled for execution are divided into three (3) priority levels, as follows:

Level 0: The background context has the lowest execution priority (Level 0). A context with a Level 0 priority may be preempted by any other context. The background context has no start event, being executed by default whenever no higher priority context is executing. The second priority level is Level 1. There are seven (7) contexts with a priority Level 1. These contexts are the lowest priority above background context, Level 0. Only one Level 1 context may be on ECS 145 at the same time. The third context is Level 2. There are eight (8) contexts with a priority Level 2. These are the highest priority contexts. Only one of the eight (8) Level 2 contexts may be on ECS 145 at one time.

Level 1 contexts may only preempt the background context. Level 2 contexts may preempt the background context and any Level 1 context.

Figure 2:
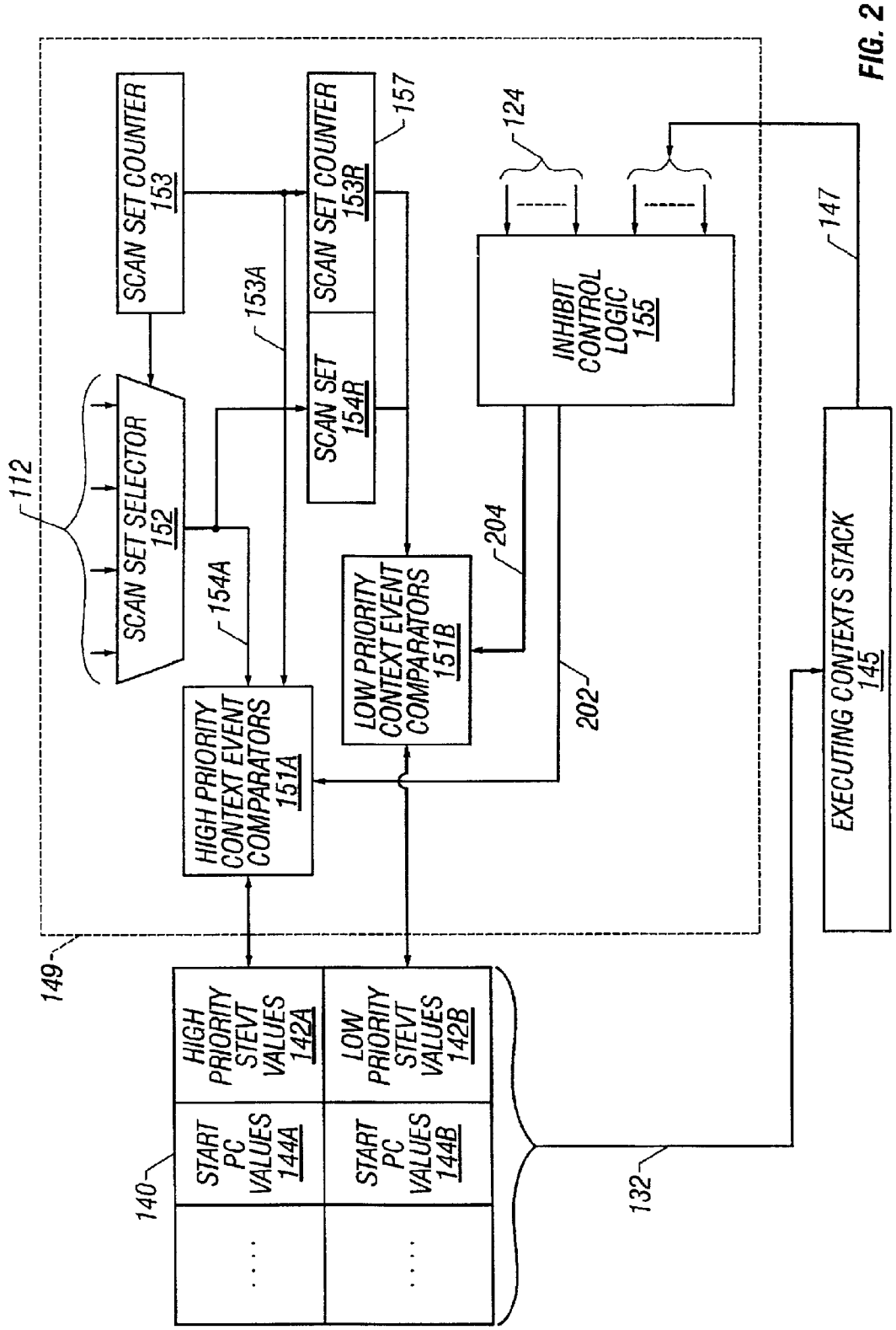
FIG. 2 shows a logic diagram for the context scheduling logic of FIG. 1 that includes high priority and low priority comparators.

Referring to FIG. 2, context store 140 stores the starting event bit fields 142A/142B and starting PC 144A/144B for each of the eight (8) high priority contexts and each of the seven (7) low priority contexts, respectively, that may be scheduled for execution by scheduler 149. Starting event bit fields 142A/142B indicate which of the condition signals 112 must be set (and at which logic level) before a specific context may be scheduled, as will be explained. Context scheduler 149 includes condition scanner logic 150 that performs context scheduling by comparing hardware condition signals 112 to a starting event that must match a specified condition signal 112 before a context may be stored as pre-empting in ECS 145. In system 100, the sixteen contexts stored in context store 140 are broken into a set of eight (8) Level 2 contexts, seven (7) Level 1 contexts and one (1) Level 0 context.

In system 100 a total of sixty-four (64) hardware condition signals 112 are used. To reduce the complexity and size of the scheduling logic and also to address the prioritization of sixteen (16) contexts, the hardware condition signals 112 are divided into four (4) groups (a "scan set") of sixteen (16) sampled condition signals 112. Each scan set is identified by a two-bit scan set number and each scan set is sampled in turn by scheduling logic 149 when determining which context to schedule. The individual conditions signals 112 are latched by the controller logic associated with the signal, for example, a flip/flop or register in I/O controller 180A–180N. However, the individual condition signals could also be latched in or near the context scheduler logic 149. Some examples of hardware conditions that are represented by condition signals 112 may include the status of a queue (queue full, queue empty, queue nearly full, etc.), the status of a transaction (completed or not complete) or the detection of a data transmission error.

Referring again to FIG. 2, context scheduler 149 includes a scan set counter 153 for producing a scan set number 153A, and a scan set selector mux 152 connected to receive hardware conditions signal 112 and for outputting a selected scan set 154A. Context scheduler also includes a set of high priority comparators 151A (eight in total) for comparing the selected scan set 154A to a set of high priority starting events values 142A from context store 140. Context scheduler also includes a condition scan word register 157 for storing the previously selected scan set 154R and the previous scan set number 153R. Context scheduler also includes a set of low priority comparators (seven in total) for comparing low priority starting events 142B to the scan set in scan word register 157.

Context scheduler logic 149 also includes inhibit control logic 155 that is connected to each of the high priority comparators 151A and low priority comparators 151B, by enable control lines 202 and 204, respectively. Enable control lines 202 and 204 are used to control the output of any high or low priority matched context to be stored in ECS 145, as will be explained.

In operation, scan set selector 152 outputs the current scan set 154A selected by scan counter 153 to high priority comparators 151A. If a hardware condition in the scan set matches one of the eight (8) high priority contexts (a context match) and inhibit control logic enables 202 the comparators then the high priority context match is stored in ECS 145.

The previous scan set 154R and scan set counter 153R stored in condition scan word register 157 is next presented to low priority context comparators 151B. The last scan set 154R and scan set counter 153R is latched in the condition scan word register 157 on each clock cycle. The delay caused by storing the last scan set 154R and scan counter 153R before presentation to low priority comparators 151B ensures that any high priority context match will be scheduled ahead of any low priority context match when the high priority and low priority contexts are waiting for the same hardware condition signal 112 in a single scan set 154A.

A full cycle of condition scanning requires four clocks to complete, i.e. scanning all four (4) scan sets. A scan set to starting event comparison is performed on each cycle by both the high priority comparators 151A and low priority comparators 151B.

Condition scanner 150 is configured to continuously scan hardware conditions 112 and compare the scan sets 154A to the starting events 142A/142B regardless of the availability of a place in ECS 145 for a new context at a particular priority level.

Inhibit control logic 155 is also connected to receive context execution signals 147 from ECS 145 and scheduling control signals 124 from decode logic 120. Execution signals 147 and control signals 124 are used to determine when to enable 204/202 the storing of a matched context from either set of comparators 151A and 151B to ECS 145. More specifically, inhibit control 155 uses context execution signals 147 to determine when to enable the storing of a matched context, if any, only when there is not an executing context at the same priority level in ECS 145 marked as pre-empting or executing (P-bit and A–bit are not set) and there are also no higher priority contexts in ECS 145 marked as executing (A–bit is not set for any higher priority contexts).

Inhibit control logic 155 may also receive an "exit" signal on scheduling control signals 124 that indicates the execution of a "context exit" instruction. If a context exit instruction for a particular priority level is executed, inhibit control logic 155 delays the reenabling of the comparators for a matched context for the same priority level. This delay from the inhibit logic ensures that changes affected in hardware conditions caused by the exiting context will have sufficient time to propagate through the system prior to re-enabling the scheduling of another context at the same or lower priority level as the exiting context.

It is often the case that more than one context will be waiting for the same hardware condition signal to be set (or cleared). This may occur when the hardware condition signal represents the availability of a shared hardware resource and different contexts compete for its use. To address this situation inhibit control logic 155 staggers the re-enabling of the high and low priority comparators when a context exit instruction is executed. This staggered enabling of the comparators 151A before comparators 151B, ensures that the low priority comparators 151B and high priority comparators 151A are comparing the same scan set. That is, a low priority context match using the previous scan set word 157 does not cause the scheduling of a low priority context before a high priority context waiting for the same condition.

Figure 3:
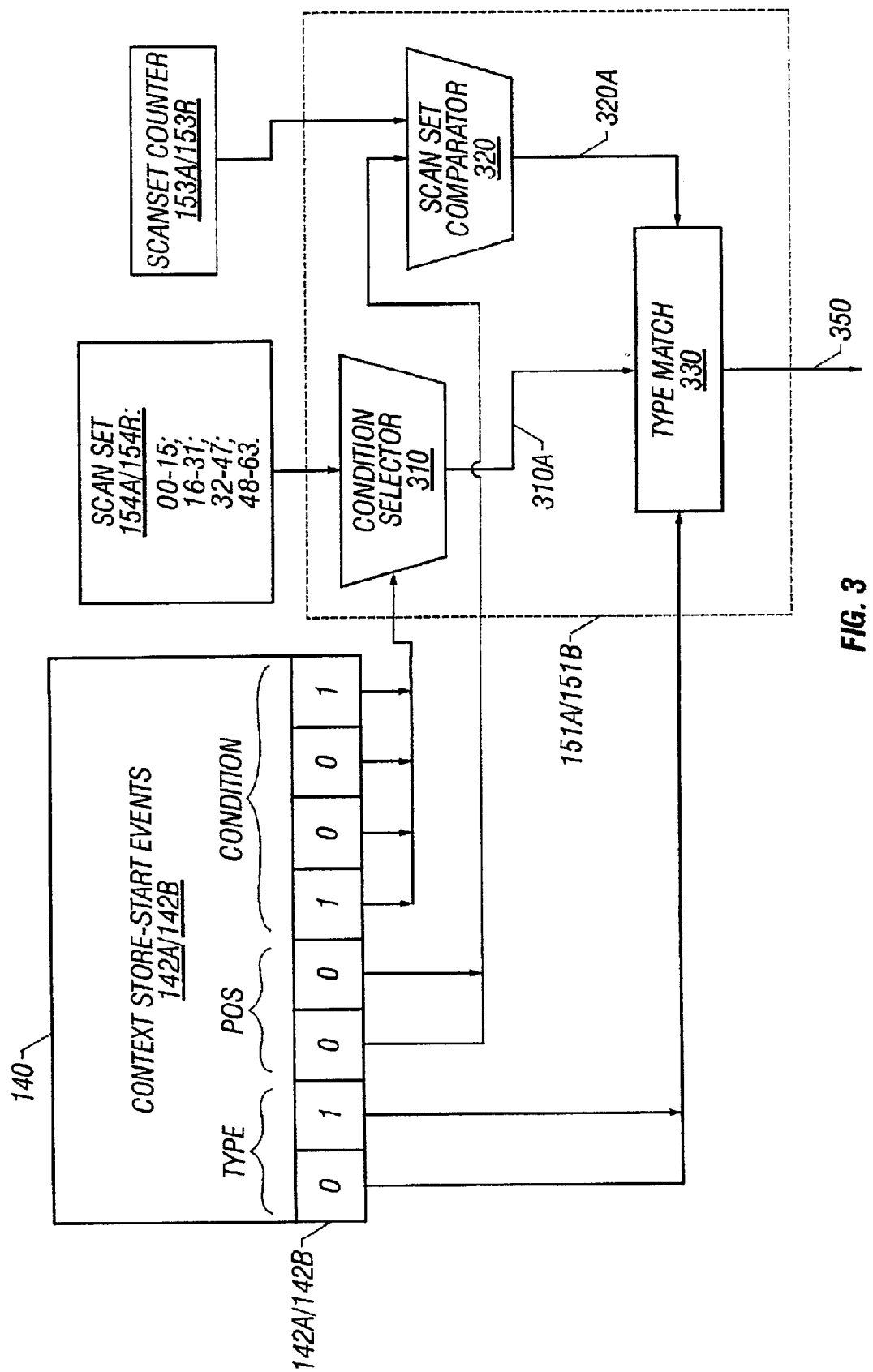
FIG. 3 shows a logic diagram for one of the high priority and low priority comparators of FIG. 2.

Referring to FIG. 3, a single comparator is shown that is representative of one of the set of eight (8) high priority comparators 151A or one of the set of seven (7) low priority comparators 151B from FIG. 2. Each comparator 151A/151B includes a condition selector mux 310 for selecting a single condition bit 310A from a scan set 154A/154R, a scan set comparator 320 for determining if the condition bit 310A is from the correct scan set and a TYPE MATCH logic block 330 for determining the polarity (logic level) of condition bit 310A that is required to indicate a starting event match.

Start event bit fields 142A/142B are 8-bits long and stored in context store 140. Start event bit fields 142A/142B includes: a 4-bit CONDITION field that indicates the hardware condition within a scan set to be matched; a 2-bit POS field for indicating which of the four (4) scan sets contains the condition signal to be matched; and a 2-bit TYPE field to indicate the polarity of the condition signal to be matched. More specifically, the 2-bit TYPE field has three possible values: the first value is used to indicate that a low logic level is to be used as a condition signal comparison; the second value is used to indicate that a high logic level is to be used; and the third value is used to indicate that matching is disabled or enabled.

In operation, CONDITION field is used to select a condition bit 310A from the currently selected scan set 154A/154R (see FIG. 2) that is input to condition selector mux 310. The selection condition bit 310A is input to TYPE MATCH logic block 330. POS field and scan set counter 153A/153R are compared by scan set comparator 320 to determine whether the current scan set matches the scan set indicated for this start event 142A/142B. Scan set comparator 320 outputs matching bit 320A that enables TYPE MATCH logic block 330 on a match (and disables if there is no match). TYPE MATCH logic block 330 receives the condition bit 310A, and if enabled by scan set match bit 320A, uses TYPE bits to determine if matching is disabled. If matching is not disabled, TYPE MATCH logic block determines from TYPE bits whether the condition bit 310A indicates a match at a high logic level or a low logic level. TYPE MATCH logic block 330 outputs a context match 350 signal to indicate whether a context match has been determined by this comparator 151A/151B.

Though specific embodiments are described there are other ways to implement features of those embodiments. For example, the executing contexts stack 145 could be made smaller or larger to handle fewer or more contexts. Also more or fewer priority levels of contexts, number of contexts stored in the control store, hardware conditions monitored and scan set groupings could be used. Other types of execution status bits and context state information can be used in determining the scheduling of contexts.

Other embodiments are within the scope of the following claims.

What is claimed is:

1. A programmable processing system that executes multiple instruction contexts comprising:
   an instruction memory for storing instructions that are executed by the system;
   fetch logic for determining an address of an instruction, with the fetch logic comprising:
   scheduling logic that schedules execution of the instruction contexts based on condition signals indicating an availability of a hardware resource, with the condition signals being divided into groups of condition signals, which are sampled in turn by the scheduling logic to provide a plurality of scan sets of sampled conditions.

2. The system of claim 1 wherein said scheduling logic further comprises:
   control logic that determines when a context may be scheduled based on the execution of another context by said system.

3. The system of claim 2 wherein said scheduling logic further comprises:
   a context store to store context information for a plurality of contexts, the context information including a priority field that indicates the execution priority level of each of the plurality of contexts; and
   an executing contexts stack to indicate the priority level of a context marked for execution.

4. The system of claim 3 wherein the executing contexts stack has a first bit field that indicates a context having context information stored in the executing contexts stack is ready to pre-empt a currently executing context.

5. The system of claim 4 wherein said executing contexts stack has a second bit field that indicates a context having context information stored in said execution stack is currently being executed.

6. The system of claim 5 wherein the first bit field and the second bit field are used by said control logic to determine when a new context may be transferred to the executing contexts stack for pre-empting another context.

7. The system of claim 6 wherein the first bit field is set by the control logic when the new context is transferred to the executing contexts stack.

8. The system of claim 3 wherein said scheduling logic further comprises:
   sampling logic that receives the condition signals; and
   a scan set counter that selects a first scan set to be output from said sampling logic.

9. The system of claim 8 wherein said context store includes a starting event field associated with one of said plurality of contexts, with the starting event field used by said scheduling logic to determine whether a bit of the condition signal contained within the first scan set matches a bit indicated by the starting event field.

10. The system of claim 9 wherein the starting event field comprises:
    a condition field indicating which condition signal within a scan set must be set for this context to be scheduled for execution; and
    a scan set indicator field indicating which of the plurality of scan sets contains the condition signal which must be set for this context to be scheduled for execution.

11. The system of claim 10 wherein the starting event field further comprises:
    a type bit field specifying the polarity of the condition signal that indicates the condition signal is set.

12. The system of claim 9 wherein said scheduling logic further comprises:
    a low priority comparator and a high priority comparator that compare a selected scan set to a low priority start event context and a high priority start event context.

13. The system of claim 12 wherein said scheduling logic further comprises:
    a scan word register that stores the last selected scan set and the last scan set counter value, said scan word register being input to said low priority comparator for comparing the last selected scan set at a time after the high priority comparison on the last context scan set has completed.

14. The system of claim 9 further comprise:
    at least one input/output logic block, said input/output logic block also providing at least one of the condition signals to the scheduling logic.

15. The system of claim 9 wherein said inhibit control logic delays the enabling of the low priority context before the high priority context when an instruction causes a context exit.

16. The system of claim 9 further comprises:

a plurality of coprocessor engines that execute multiple instruction contexts, said plurality of coprocessor engines also providing a set of coprocessor condition signals to said scheduling logic.

17. The system of claim 16 wherein at least one said plurality of coprocessors further comprise:

at least one off a buffer and an address queue, said at least one coprocessor also providing at least one of the condition signals to the scheduling logic.

18. A method of operating a programmable processing system, the method comprising:

scheduling execution of an instruction context based on condition signals indicating an availability of a hardware resource, with the condition signals being divided into groups of condition signals, which are sampled to provide a plurality of scan sets of sampled conditions.

19. The method of claim 18 wherein context information is stored that includes a starting event for each context that may be scheduled for execution, the method further comprises:

determining that a starting event for a context matches one of the sampled conditions in one of the plurality of scan sets.

20. The method of claim 19 wherein said determining further comprises:

determining when a context may be scheduled based on a level of priority of a currently executing context.

21. The method of claim 20 further comprises:

dividing context information into at least two priority levels; and scheduling a higher priority context for execution having a starting event that matches a sampled condition before a lower priority context having the same starting event.

22. A computer program stored in a computer readable medium having instructions causing a computer to:

schedule execution of an instruction context based on condition signals based on an availability of a hardware resources with the condition signals being divided into groups of condition signals, which are sampled to provide a plurality of scan sets of sampled conditions.

23. The computer program of claim 22 further comprising instruction causing a computer to:

determine that a starting event for a context matches one of the sampled conditions in one of the plurality of scan sets.

* * * * *